(12) United States Patent
Lee

(10) Patent No.: US 10,282,848 B2
(45) Date of Patent: May 7, 2019

(54) AUTOMATIC DETECTION AND ANALYSIS OF TRAFFIC SIGNAL TYPE INFORMATION USING IMAGE DATA CAPTURED ON A VEHICLE

(71) Applicant: THINKWARE CORPORATION, Seongnam-si, Gyeonggi-do (KR)

(72) Inventor: Han Woo Lee, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 15/604,215

(22) Filed: May 24, 2017

(65) Prior Publication Data

US 2017/0256064 A1    Sep. 7, 2017

Related U.S. Application Data

(63) Continuation of application No. 14/739,572, filed on Jun. 15, 2015.

(30) Foreign Application Priority Data

Jun. 16, 2014   (KR) .................. 10-2014-0073041

(51) Int. Cl.
*G06T 7/70* (2017.01)
*G06T 7/20* (2017.01)
*G06K 9/00* (2006.01)

(52) U.S. Cl.
CPC ............ *G06T 7/20* (2013.01); *G06K 9/00818* (2013.01); *G06T 7/70* (2017.01); *G06T 2207/10016* (2013.01); *G06T 2207/10024* (2013.01); *G06T 2207/30252* (2013.01)

(58) Field of Classification Search
CPC .. G06K 9/00785; G06K 9/00818; G06T 5/50; G06T 7/20
See application file for complete search history.

(56) References Cited

U.S. PATENT DOCUMENTS

| | | | | |
|---|---|---|---|---|
| 7,230,538 B2* | 6/2007 | Lai | .................. | A61H 3/061 340/4.12 |
| 7,489,802 B2* | 2/2009 | Smilansky | ......... | G06K 9/00778 348/143 |
| 8,040,227 B2* | 10/2011 | Friedrichs | ............... | G06T 7/223 340/435 |
| 8,559,673 B2* | 10/2013 | Fairfield | ............ | G06K 9/00825 342/357.25 |
| 9,586,585 B2* | 3/2017 | Delp | ................... | B60W 30/181 |

(Continued)

FOREIGN PATENT DOCUMENTS

| CN | 101783964 A | * | 7/2010 |
|---|---|---|---|
| CN | 102117546 A | * | 7/2011 |

(Continued)

*Primary Examiner* — Chan S Park
*Assistant Examiner* — Mai H Tran
(74) *Attorney, Agent, or Firm* — Novick, Kim & Lee, PLLC; Sang Ho Lee

(57) ABSTRACT

Provided herein is a control method of an electronic apparatus. The control method of an electronic apparatus includes: generating signal type information using an image data of a signal region portion of a signal lamp in a driving-related image data of a vehicle; and performing a driving-related guide of the vehicle using the generated signal type information.

16 Claims, 12 Drawing Sheets

(56) References Cited

U.S. PATENT DOCUMENTS

| | | | |
|---|---|---|---|
| 9,767,371 B2* | 9/2017 | Ai | G06K 9/66 |
| 2002/0080998 A1* | 6/2002 | Matsukawa | G06K 9/00818 |
| | | | 382/103 |
| 2005/0036660 A1* | 2/2005 | Otsuka | B60Q 1/1423 |
| | | | 382/104 |
| 2006/0034484 A1* | 2/2006 | Bahlmann | G06K 9/00818 |
| | | | 382/103 |
| 2006/0132870 A1* | 6/2006 | Kitajima | H04N 9/735 |
| | | | 358/516 |
| 2007/0047809 A1* | 3/2007 | Sasaki | G06K 9/00791 |
| | | | 382/170 |
| 2009/0174573 A1* | 7/2009 | Smith | G08G 1/0962 |
| | | | 340/905 |
| 2009/0303077 A1* | 12/2009 | Onome | G08G 1/096716 |
| | | | 340/901 |
| 2010/0027009 A1* | 2/2010 | Bhotika | B61L 3/065 |
| | | | 356/404 |
| 2010/0109908 A1* | 5/2010 | Miura | B60R 16/0232 |
| | | | 340/905 |
| 2011/0135155 A1* | 6/2011 | Kudo | G06K 9/2054 |
| | | | 382/104 |
| 2012/0257058 A1* | 10/2012 | Kinoshita | G06T 3/0012 |
| | | | 348/148 |
| 2013/0027557 A1* | 1/2013 | Hirai | B60S 1/0844 |
| | | | 348/148 |
| 2013/0038754 A1* | 2/2013 | Watarai | H04N 5/77 |
| | | | 348/231.3 |
| 2013/0077830 A1* | 3/2013 | Liu | G06K 9/00818 |
| | | | 382/104 |
| 2013/0197760 A1* | 8/2013 | Castaneda | B66F 9/07581 |
| | | | 701/41 |
| 2013/0245945 A1* | 9/2013 | Morita | G08G 1/096716 |
| | | | 701/533 |
| 2013/0293582 A1* | 11/2013 | Ng-Thow-Hing | G06T 19/006 |
| | | | 345/633 |
| 2014/0046581 A1* | 2/2014 | Ota | G08G 1/096716 |
| | | | 701/408 |
| 2014/0226349 A1* | 8/2014 | Morishita | G06K 9/00825 |
| | | | 362/466 |
| 2015/0186734 A1* | 7/2015 | Nakagawa | G06K 9/00791 |
| | | | 382/104 |
| 2015/0316387 A1* | 11/2015 | Ichikawa | G01C 21/3658 |
| | | | 701/532 |
| 2015/0363652 A1* | 12/2015 | Lee | G06T 7/20 |
| | | | 382/104 |
| 2017/0068863 A1* | 3/2017 | Rattner | G06K 9/00838 |
| 2017/0256064 A1* | 9/2017 | Lee | G06T 7/20 |
| 2018/0197026 A1* | 7/2018 | Oki | G08G 1/09 |

FOREIGN PATENT DOCUMENTS

| | | | |
|---|---|---|---|
| CN | 102176287 A | * | 9/2011 |
| CN | 102556043 A | | 7/2012 |
| CN | 102679993 A | * | 9/2012 |
| CN | 103345766 A | * | 10/2013 |
| CN | 103395391 A | * | 11/2013 |
| WO | 2012144255 A1 | | 10/2012 |

* cited by examiner

AUTOMATIC DETECTION AND ANALYSIS OF TRAFFIC SIGNAL TYPE INFORMATION USING IMAGE DATA CAPTURED ON A VEHICLE

CROSS-REFERENCE TO RELATED APPLICATIONS

This application is a continuation application of U.S. nonprovisional application Ser. No. 14/738,572 filed on Jun. 15, 2015, which claims priority from Korean Patent Application No. 10-20140073041, filed on Jun. 16, 2014, in the Korean Intellectual Property Office, the disclosures of which are incorporated herein by reference in their entirety.

BACKGROUND OF THE INVENTION

Field of the Invention

The present invention relates to an electronic apparatus, a control method of the electronic apparatus and a computer readable recording medium, and more particularly, to an electronic apparatus, a control method of the electronic apparatus and a computer readable recording medium capable of recognizing a signal type of a signal lamp and performing a vehicle driving related guide based on the recognition.

Description of the Related Art

The most important thing when a user drives a vehicle is a safe driving and a prevention of any traffic accident. For this, a variety of assistant devices and a safety device, for example, a safety belt, an airbag, etc. are provided in a vehicle in order to perform the functional functions of vehicle component devices.

Furthermore, a device, for example, a black box, is increasingly installed in a vehicle so as to investigate the reasons for a vehicle accident when a vehicle has an accident in such a manner to store the running-related images of a vehicle and the data transferred from various sensors. A portable terminal, for example, a smart phone, a tablet, etc. is equipped with the function of a black box or a navigation application, etc. and is usually used as one of vehicle devices.

However, the applicability of such running-related images is actually low in the vehicle devices. More specifically, even though the running-related images of a vehicle are obtained through a vision sensor, for example, a camera provided in the vehicle, the electronic apparatus of the vehicle is designed to simply display or transmit such data or generate a simple alarming information, for example, a line departing state, etc.

In addition, as an electronic apparatus for a vehicle which becomes newly commercial in recent years, a HUD (Head Up Display) or an augmented reality interface are proposed, however the applicability of the running-related images of a vehicle is a simple display or a simple generation of alarming information.

SUMMARY OF THE INVENTION

The present invention is made in an effort to resolve the above-mentioned problems.

Accordingly, an object of the present invention is to provide an electronic apparatus, a control method of the electronic apparatus and a computer readable recording medium capable of generating signal type information of a signal lamp using a driving related image data of a vehicle and performing a vehicle driving related guide based on the generated signal type information.

To achieve the above objects, a control method of an electronic apparatus includes: generating signal type information using an image data of a signal region portion of a signal lamp in a driving-related image data of a vehicle; and performing a driving-related guide of the vehicle using the generated signal type information.

In addition, the control method may further include: determining whether the vehicle is in a stopping state using the driving-related image data, wherein the generating of the signal type information is performed when the vehicle is in the stopping state.

In addition, the determining whether the vehicle is in the stopping state may include: generating a gray image data for the driving-related image data; and determining whether the vehicle is in the stopping state by comparing each of a plurality of frames included in the generated gray image data.

In addition, the generating of the signal type information may include: determining a region-of-interest including the signal lamp in the driving-related image data; and converting the image data of the determined region-of-interest based on a preset pixel value to generate a region-of-interest image data.

In addition, the generating of the signal type information may include: detecting the image data of the signal region portion of the signal lamp by applying a first region having a first area and a second region including the first region and having a second area to the region-of-interest image data; comparing a difference between an area pixel value of the second region and an area pixel value of the first region with a preset area pixel value; and generating the signal type information of the signal lamp as a result of the comparison.

In addition, the signal type information may be information for identifying each of the plurality of signals which is displayed in the signal lamp.

In addition, the performing of the driving-related guide of the vehicle may include outputting a signal guide using the signal type information.

In addition, the performing of the driving-related guide of the vehicle may include outputting a signal change guide using path information for road guide of the vehicle and the signal type information.

In addition, the outputting may be performed if the vehicle is in a stopping state during a preset time from timing when the signal of the signal lamp is changed.

In addition, the outputting may include: generating an indicator for performing the driving-related guide; and outputting the generated indicator based on augmented reality.

Meanwhile, to achieve the above objects, an electronic apparatus includes: a signal type information generation unit generating signal type information using an image data of a signal region portion of a signal lamp in a driving-related image data of a vehicle; and a control unit performing a driving-related guide of the vehicle using the generated signal type information.

In addition, the electronic apparatus may further include: a driving state determining unit determining whether the vehicle is in a stopping state using the driving-related image data, wherein the control unit controls the signal type information generation unit to generate the signal type information if it is determined that the vehicle is in the stopping state.

In addition, the driving state determining unit may generate a gray image data for the driving-related image data and compare each of the plurality of frames included in the generated gray image data to determine whether the vehicle is in the stopping state.

In addition, the signal type information generation unit may determine a region-of-interest including the signal lamp in the driving-related image data; and convert the image data of the determined region-of-interest based on a preset pixel value to generate a region-of-interest image data.

In addition, the signal type information generation unit may detect the image data of the signal region portion of the signal lamp by applying a first region having a first area and a second region including the first region and having a second area to the region-of-interest image data, compare a difference between an area pixel value of the second region and an area pixel value of the first region with a preset area pixel value, and generate the signal type information of the signal lamp as a result of the comparison.

In addition, the signal type information may be information for identifying each of the plurality of signals which is displayed in the signal lamp.

In addition, the control unit may control an output unit to output a signal guide using the signal type information.

In addition, the control unit may output a signal change guide using path information for road guide of the vehicle and the signal type information.

In addition, the control unit may control the output unit to output the signal change guide if the vehicle is in a stopping state during a preset time from timing when the signal of the signal lamp is changed.

In addition, the control unit may control the output unit to generate the indicator for performing the driving-related guide and output the generated indicator based on the augmented reality.

Meanwhile, to achieve the above objects, a recording medium according to an embodiment of the present invention may have a program code for executing the above-described control method on a computer.

According to the above various embodiments of the present invention, it is possible to generate the signal type information of the signal lamp located on a road where the vehicle stops or drives and perform the vehicle driving related guide based on the generated signal type information.

Further, according to the above various embodiments of the present invention, it is possible to perform a driver assistance role by guiding the signal to the driver of the vehicle using the signal type information.

Further, according to the above various embodiments of the present invention, it is possible to promote the user convenience by accurately informing the signal change using the navigation path and the signal type information.

Further, according to the above various embodiments of the present invention, it is possible to provide the guide to the driver using the more intuitive method, by performing the vehicle driving related guide like the road guide, the signal guide, the signal change guide, etc., on the augmented reality.

DETAILED DESCRIPTION OF THE PREFERRED EMBODIMENT

Figure 1:
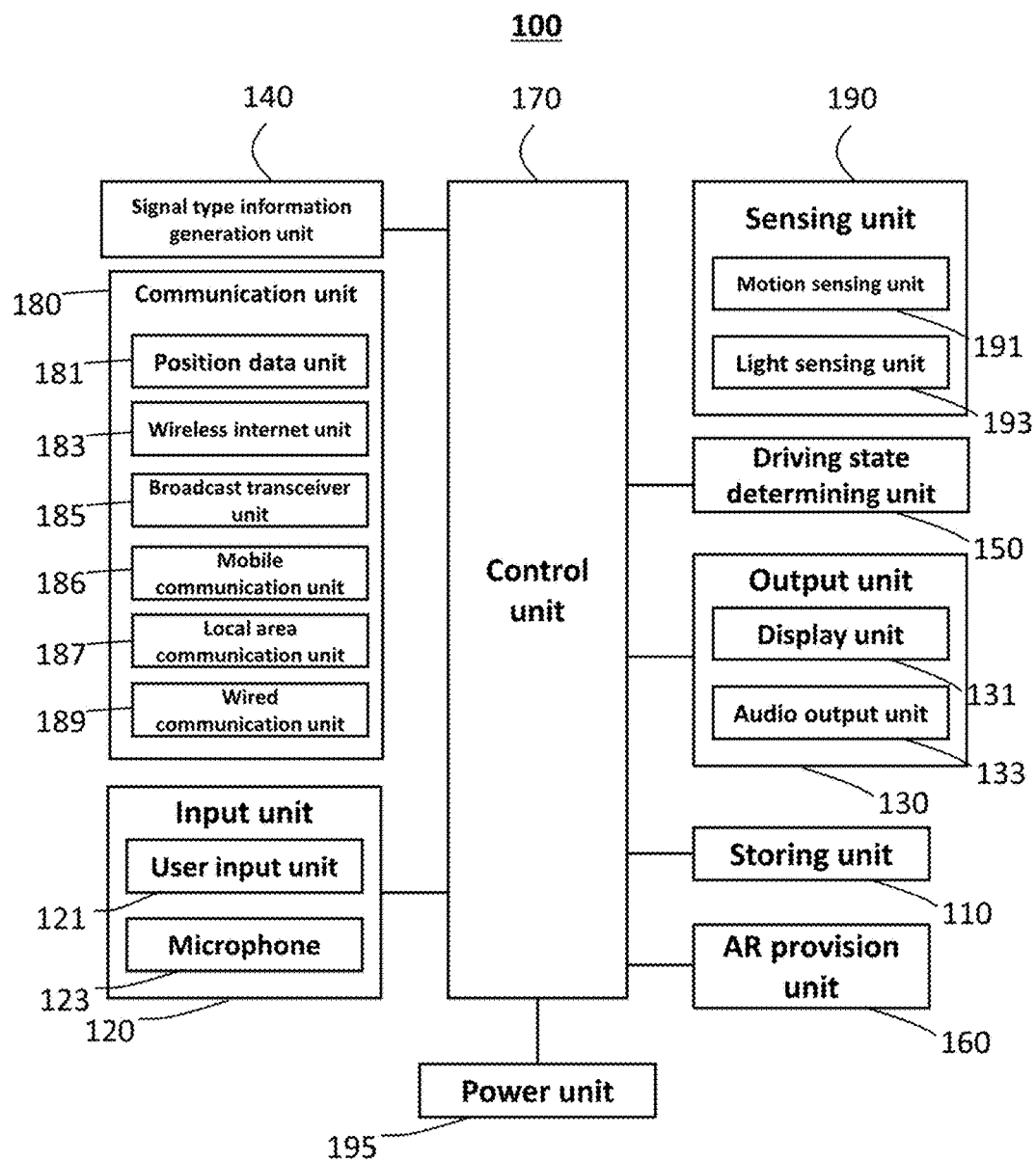
FIG. 1 is a block diagram depicting an electronic apparatus according to an embodiment of the present invention.

The descriptions hereinafter propose the principles of the invention, so it is obvious that a person having ordinary skill in the art can implement the principle of the invention even though it is not described or depicted in the present specification and can invent various apparatuses included in the concept and scope of the invention. In addition, it should be understood that the conditional terms and embodiments listed in the present invention are principally intended to help the concepts of the present invention to be fully understood, not limiting the listed embodiments and states.

In addition, it should be understood that all the detailed descriptions listing the principle, view point and embodiments as well as specific embodiments of the present invention are intended to include the structural and functional equivalents of these matters. In addition, it should be understood that these equivalent matters include all the devices invented to perform the same functions irrespective of the currently known equivalent matters as well as the equivalent matters, namely, structures which will be developed in the future.

Therefore, for example, it should be understood that the block diagrams of the present specification are intended to show the conception view points of the exemplary circuits which embody the principles of the present invention. In similar ways, all the flows, state conversion diagrams, pseudo codes, etc. may be substantially expressed on a computer readable medium and may represent various processes which can be executed by a computer or a processor irrespective of whether the computer or the processor is clearly illustrated or not.

The functions of various element depicted in the drawings and including the processor or the functional blocks indicates in the form of similar concepts may be executed using an exclusive hardware as well as the hardware which has abilities to execute the related software. When it is provided by the processor, the above functions may provided by a single exclusive processor, a single shared processor or a plurality of individual processors, and a part of them may be shared.

The correct use of the processor or the term which is suggested as a concept similar therewith should not be interpreted in such a way to exclusively cite the hardware which has an ability to execute software, and it should be interpreted that it is indented to implicitly include ROM, RAM and a nonvolatile memory. Well known other hardware may be included.

In the claims of the present specification, the components expressed as a method of executing the functions recited in the detailed descriptions are intended to include all the methods for executing the functions which include all types of software including a combination of circuit elements performing, for example, the above functions or a firmware/micro code, etc. and may be combined with an appropriate circuit to execute the software. It should be understood that the present invention defined by such claims is combined with the functions provided by variously listed means and with the ways that the claims require, so any means for providing the above functions should be understood to be equivalent to what can be recognized from the present specification.

The above-described objects, features and advantages could become clear with the aid of the following descriptions in relation with the accompanying drawings, and a person having ordinary skill in the art to which the present invention pertains can easily implement the technical concepts of the present invention. In addition, while the present invention is being described, if it is determined that the descriptions with respect to the known technology in relation with the present invention may make unclear the subject matters of the present invention, such detailed descriptions would be omitted.

Various embodiments of the present invention will be described with reference to the accompanying drawings.

FIG. 1 is a block diagram depicting an electronic apparatus according to an embodiment of the present invention. Referring to FIG. 1, the electronic apparatus 100 may include all or a part of a storing unit 110, an input unit 120, an output unit 130, a signal type information generation unit 140, a driving state determining unit 150, an augmented reality provision unit 160, a control unit 170, a communication unit 180, and a sensing unit 190.

Here, the electronic apparatus 100 may be implemented using a smart phone, a tablet computer, a palm computer, a PDA (Personal Digital Assistant), a PMP (Portable Multimedia Player), a smart glass, a project glass, a navigation, a black box, etc. each of which may provide to a vehicle driver a driving-related information.

Here, the driving state of the vehicle may include, not limited to, a variety of states where the vehicle is being driven by a driver, for example, a stopping state of the vehicle, a running state of the vehicle, a parking state of the vehicle, etc.

The driving-related guide may include, not limited to, a variety of guides to assist the driving of a vehicle driver, for example, a road guide, a line departing guide, a forward vehicle starting guide, a signal guide, a signal change guide, a forward vehicle collision guide, a lane change guide, a lane guide, etc.

Here, the road guide may include, but limited to, an augmented reality road guide performing road guide by combining various information, for example, a user's position, direction, etc. with the images of the forward scenes of the currently driving vehicle, and a 2D (2-Dimensional) or 3D (3-Dimensional) road guide performing a road guide by combing the map data of the 2D or 3D with various information, for example, a user's position, direction, etc. Here, the road guide may be interpreted as an occasion wherein a driver drives on the vehicle as well as a concept including a road guide where a user moves walking or running.

In addition, the line departing guide may be a guide to guide whether the running vehicle departs from the lane or not.

Further, the forward vehicle starting guide may guide whether another vehicle in front of an own vehicle which is stopping start.

In addition, the signal guide may be a guide for guiding the signal states of a signal lamp positioned in front of the driving vehicle, for example, a stop signal, a straight signal, a left turn signal, a right turn signal, etc. Here, the colors and types corresponding to each signal may be different for each nation. In case of Korea, the stop signal is a red color, the straight signal is a green color, the left turn signal is a green color and a left turn arrow, and the right turn signal is a green color and a right turn arrow.

In addition, the signal change guide may be a guide for guiding that the signal state, for example, a signal lamp positioned in front of the driving vehicle, has changed. For an example, if the signal changed from the stop signal to the straight signal, this may be guided.

In addition, the forward vehicle collision prevention guide may be a guide for guiding a collision with the forward vehicle when the distance to the vehicle which stops in front of the stopping or running vehicle becomes within a predetermined distance.

In addition, the lane change guide may a guide for guiding a change from the lane where the vehicle is positioned to another lane for the sake of a pathway guide to the destination.

In addition, the lane guide may be a guide for guiding the lane where the vehicle is currently positioned.

The driving-related images which help various driving guide functions may be photographed in real time by the camera hung in the forward direction. Here the camera may be a camera which may be integrally formed with the electronic apparatus 100 hung in the vehicle so as to photograph the forward scenes of the vehicle. In this case, the camera may be integral with the smart phone, the navigation or the black box, and the electronic apparatus 100 may receive the images photographed by the integral camera.

As another example, the camera may be hung different from the electronic apparatus 100 and may photograph the forward scenes of the vehicle. In this case, the camera may be a separate black box which hung for the forward direction of the vehicle, and the electronic apparatus 100 may receive the photographed images based on a wired/wireless communication with the separately hung black box or may receive the photographed images when a storing medium for storing the photographed images of the black box is inserted in the electronic apparatus 100.

Hereinafter, the electronic apparatus 100 according to an embodiment of the present invention will be described in more details based on the above contents.

The storing unit 110 has a function for storing various data and applications which are necessary for the operations of the electronic apparatus 100. In particular, the storing unit 110 may store the data necessary for the operations of the electronic apparatus 100, for example, OS, a pathway search application, a map data, etc. In addition, the storing unit 110 may store the data generated by the operations of the electronic apparatus 100, for example, a searched pathway data, a received image, etc. In addition, the storing unit 110 may store position-related information of a plurality of signals included in the signal lamp.

Here, the storing unit 110 may be implemented using a built-in type storing element, for example, RAM (Random Access Memory), Flash Memory, ROM (Read Only Memory), EPROM (Erasable Programmable ROM) EEPROM (Electronically Erasable and Programmable ROM), a register, a hard disk, a removable disk, a memory card, USIM (Universal Subscriber Identity Module), etc. or a detachable type storing element, for example, a USB memory, etc.

The input unit 120 has a function for converting physical input from the outside of the electronic apparatus 100 into a specific electrical signal. Here, the input unit 120 may be all or part of a user input unit 121 and a microphone unit 123.

The user input unit 121 may receive a user's input, for example, a touch, a push operation, etc. Here, the user input unit 120 may be implemented using at least one among a various button types touch sensor which receive touch inputs, and a near sensor for receiving an approaching motion.

The microphone unit 123 may receive a user's voice and sound from the inside or outside of the vehicle.

The output unit 130 is a device for outputting the data of the electronic apparatus 100. Here, the output unit 130 may be all or part of a display unit 131 and an audio output unit 133.

The display unit 131 is a device for outputting data that the electronic apparatus 100 may visually recognize. The display unit 131 may be implemented with a display unit provided at a front side of the housing of the electronic apparatus 100. Here, the display unit 131 is formed integral with the electronic apparatus 100 and may output a visual recognition data and is installed separate from the electronic apparatus 100 like the HUD and may output a visual recognition data.

The audio output unit 133 is a device for outputting the data that the electronic apparatus 100 may audibly recognize. The audio output unit 133 may be formed of a speaker which may output in the forms of sound the data which should be informed to the user of the electronic apparatus 100.

The communication unit 180 may provide to communicate with another device. The communication unit 180 may include, not limited to all or part of a position data unit 181, a wireless internet unit 183, a broadcast transceiver unit 185, a mobile communication unit 186, a local area communication unit 187 and a wired communication unit 189.

The position data unit 181 is a device for obtaining the position data through the GNSS (Global Navigation Satellite system). The GNSS means a navigation system which may calculate the position of the receiver terminal using radio signals from the satellite. As an example of the GNSS, there may, based on its operation body, be GPS (Global Positioning System), Galileo, GLONASS (Global Orbiting Navigational Satellite System), COMPASS, IRNSS (Indian Regional Navigational Satellite System), QZSS (Quasi-Zenith Satellite System), etc. The position data unit 181 of the electronic apparatus 100 according to an embodiment of the present invention may obtain a position data by receiving a GNSS signal which is served in a region where the electronic apparatus 100 is being used.

The wireless internet unit 183 is a device for connecting to the wireless internet, thus obtaining or transmitting the data. The wireless internet unit through the wireless internet unit 183 for connecting to the wireless internet may include, but not limited to, WLAN (Wireless LAN), Wibro (Wireless broadband), Wimax (World interoperability for microwave access), HSDPA (High Speed Downlink Packet Access), etc. . . . .

The broadcast transceiver unit 185 is a device for transmitting and receiving broadcast signals through various broadcast systems. The broadcast system for transmitting and receiving through the broadcast transceiver 185 may include, but not limited to, DMBT (Digital Multimedia Broadcasting Terrestrial), DMBS (Digital Multimedia Broadcasting Satellite), MediaFLO (Media Forward Link Only), DVBH (Digital Video Broadcast Handheld), ISDBT (Integrated Services Digital Broadcast Terrestrial), etc. The broadcast signal which may be transmitted or received through the broadcast transceiver unit 185 may include, but not limited to, a traffic data, a life data, etc.

The mobile communication unit 186 may communicate by connecting to a mobile communication network in compliance with various mobile communication criteria, for example, 3G (3rd Generation), 3GPP (3rd Generation Partnership Project), LTE (Long Term Evolution), etc.

The local area communication unit 187 is a device for the sake of a local area communication. The local area communication unit 187 may provide to communicate through Bluetooth, RFID (Radio Frequency Identification), infrared ray communication (IrDA, Infrared Data Association), UWB (Ultra WidBand), ZigBee, NFC (Near Field Communication), WiFi, etc.

The wired communication unit 189 is an interface device for connecting the electronic apparatus 100 to another device through a wired connection. The wired communication unit 119 may be a USB module which may communicate through the USB port.

The communication unit 180 may communicate with another device using at least one of the position data unit 181, a wireless internet unit 183, a broadcast transceiver unit 185, a mobile communication unit 186, a local area communication unit 187, and a wired communication unit 189.

As an example, in case where the electronic apparatus 100 does not include a camera function, using at least one of the local area communication unit 187 and the wired communication unit 189, it is possible to receive the images taken by the vehicle camera, for example, a black box, etc.

As another example, in case where a communication is made to multiple devices, any one of them communicate with the local area communication unit 187, and the other one of them may communicate through the wired communication unit 119.

The sensing unit 190 is a device for detecting the current state of the electronic apparatus 100 and may include, but not limited to, all or part of a motion sensing unit 191 and a light sensing unit 193.

The motion sensing unit 191 may detect the motion in the 3D space of the electronic apparatus 100. The motion sensing unit 191 may be a 3-axis geomagnetic sensor and a 3-axis acceleration sensor. The motion data obtained by the motion sensing unit 191 is combined with the position data obtained by the position data unit 181, thus calculating a more accurate trace than the vehicle with the electronic apparatus 100.

The light sensing unit 193 is a device for measuring surrounding illuminance of the electronic apparatus 100 and allows to change the brightness of the display unit 131 to the surrounding brightness using the illuminance data obtained through the light sensing unit 193.

The power unit 195 is a device for supplying power which is necessary for the operation of the electronic apparatus 100 and the operation of another device connected to the electronic apparatus 100. The power unit 195 may be a device for receiving power from external power source, for example, a battery in the electronic apparatus 100 or a vehicle. In addition, the power unit 195 may, depending on the type for receiving power, be implemented in the form of a wired communication module 119 or a device for receiving power through a wireless connection.

Meanwhile, the control unit 170 controls the whole operations of the electronic apparatus 100. In more detail, the control unit 170 may control all or part of the storing unit 110, the input unit 120, the output unit 130, a signal type information generation unit 140, a driving state determining unit 150, the AR provision unit 160, the communication unit 180, and the sensing unit 190.

The signal type information generation unit 140 may generate signal type information using an image data of a signal region portion of a signal lamp in the driving-related image data.

In detail, the signal type information generation unit 140 may determine a region-of-interest including the signal lamp in the driving-related image data and convert the determined region-of-interest image data based on a preset pixel value to generate the region-of-interest image data. Further, the signal type information generation unit 140 may apply a first region having a first area and a second region including the first region and having a second area to the region-of-interest image data to detect the image data of the signal region portion of the signal lamp. Further, signal type information generation unit 140 may compare a difference between an area pixel value of the second region and an area pixel value of the first region with a preset area pixel value and generate the signal type information of the signal lamp based on the comparison result.

Here, the signal type information is information for identifying each of the plurality of signals which may be displayed on the signal lamp and may include stop signal information, straight signal information, left turn signal information, right turn signal, etc.

Meanwhile, the signal type information generation operation of the above-mentioned signal type information generation unit 140 may be performed when the driving state determining unit 150 determines that the vehicle is in the stopping state.

In detail, the driving state determining unit 150 may determine whether the vehicle is in the stopping state using the driving-related data. In more detail, the driving state determining unit 150 may generate the gray image data for the driving-related image data and sequentially compare each of the plurality of frames included in the generated gray image data in a time order to determine whether the vehicle is in the stopping state.

As the determining result of the driving state determining unit 150, if it is determined that the vehicle is in the stopping state, the control unit 170 may control the signal type information generation unit 140 to generate the signal type information.

Meanwhile, the control unit 170 may perform the driving-related guide of the vehicle using the signal type information generated from the signal type information generation unit 140.

For example, the control unit 170 may control the output unit 130 to output the signal guide using the signal type information generated from the signal type information generation unit 140. In detail, the control unit 170 may control the output unit 130 to output what the signal state of the signal lamp is, for example, the stop signal, the straight signal, the right turn, the left turn, etc., as an image or a voice.

As another example, the control unit 170 may control the output unit 130 to output the signal change guide using the signal type information and the path information for road guide which are generated from the signal type information generation unit 140. In detail, the control unit 170 may control the output unit 130 to output the signal change guide using the path information for road guide to a destination and the signal type information when the electronic apparatus 100 performs the road guide to the destination of the vehicle. That is, when the signal type information generated from the signal type information generation unit 140 is changed from the stop signal to the left turn signal in the state in which the path information of the vehicle stopping at an intersection is in a straight direction, the control unit 170 may control the output unit 130 not to output the signal change guide. Also, when the signal type information generated from the signal type information generation unit 140 is changed from the stop signal to the straight signal in the state in which the path information of the vehicle stopping at the intersection is in the straight direction, the control unit 170 may control the output unit 130 to output the signal change guide. In this case, the control unit 170 may control the output unit 130 to output the signal change guide if the vehicle is in the stopping state during a preset time from the signal change timing of the signal lamp.

Meanwhile, the control unit 170 may control the electronic apparatus 100 to perform the driving-related guide based on the augmented reality. Here, the augmented reality may be a method of visually overlaying additional information (for example, graphic element representing a point of interest (POI), a graphic element representing a path to a destination, etc.) on a screen displaying a real world that a user actually sees and providing the overlaid additional information. In this case, the control unit 170 may be linked with the augmented reality provision unit 160 to generate an indicator for performing the driving-related guide and output the generated indicator through the output unit 130. For example, the augmented reality may be provided using the HUD which uses the wind shield of the vehicle or an image overlay which uses a separate image output device. The augmented reality provision unit 160 may generate a real image or an interface image, etc. which overlaps on the glass. Based on the above features, it is possible to implement an augmented reality navigation or a vehicle infortainment system.

Figure 2:
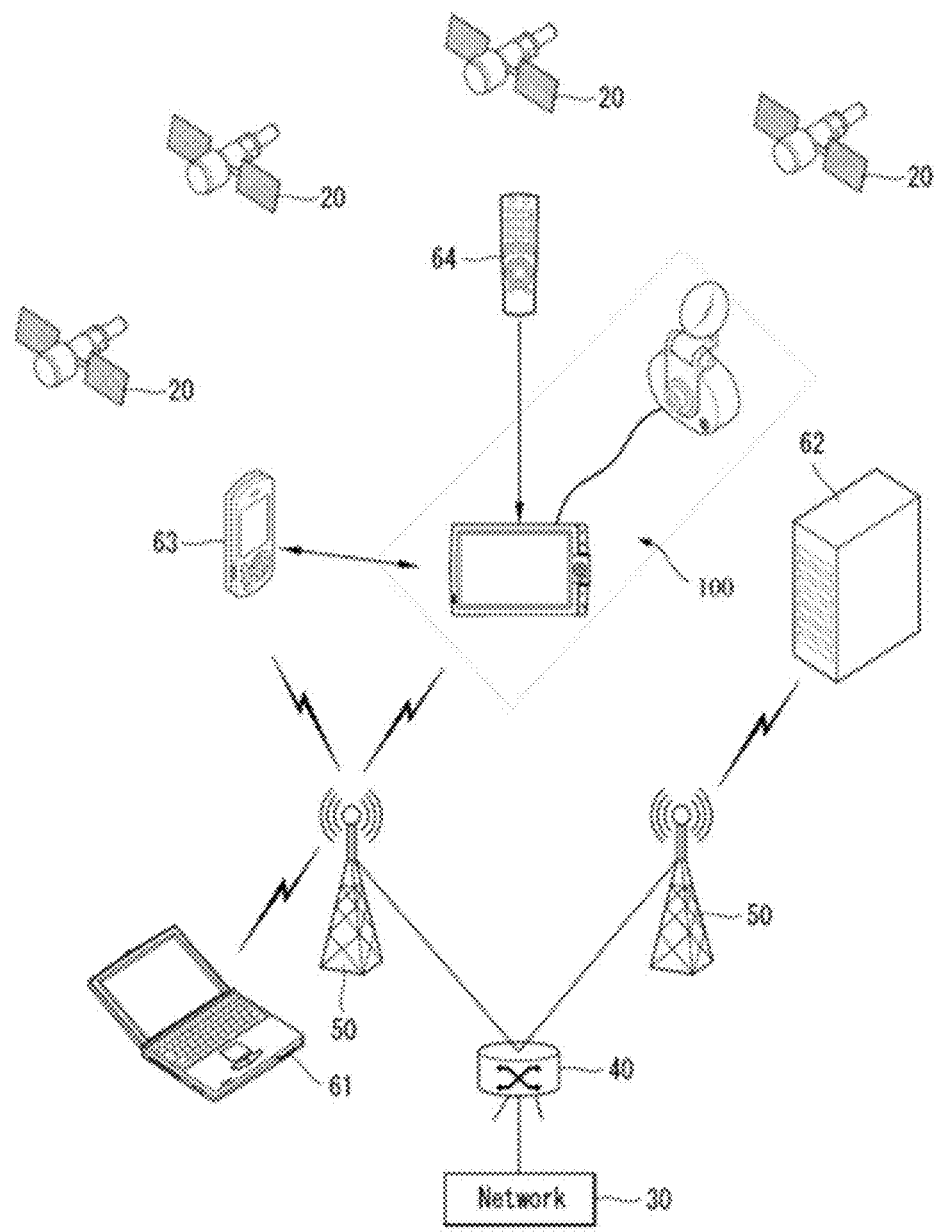
FIG. 2 is a view for describing a system network connected to the electronic apparatus according to the embodiment of the present invention.

FIG. 2 is a view for describing a system network which is connected to another electronic apparatus according to an embodiment of the present invention. Referring to FIG. 2, the electronic apparatus 100 of an embodiment of the present invention may be implemented using various devices provided in the vehicle, for example, a navigation, a black box, a smart phone or other vehicle AR interface provision device and may be connected with various communication networks and other electronic devices 61 to 64.

In addition, the electronic apparatus 100 may calculate the current position and current timing in cooperation with a GPS module in accordance with a radio signal from the satellite.

Each satellite 20 may transmit or receive L-band frequencies the frequency bands of which are different. The electronic apparatus 100 may calculate the current position based on the time which has lapsed until the L-band frequency from each satellite 20 reaches the electronic apparatus 100.

Meanwhile, the electronic apparatus 100 may connect to the network 30 in a wireless way through the communication unit 180 and through the control station 40 (ACR) and the base station 50 (RAS). When the electronic apparatus 100 gets connected to the network 30, it may indirectly connected to the electronic devices 61 and 62, thus exchanging the data.

Meanwhile, the electronic apparatus 100 may indirectly connect to the network 30 through another device 63 which has a communication function. For example, in case where the electronic apparatus 100 is not equipped with a module which may connect to the network 30, it is possible to communicate with another device 63 which has a communication function through the local area communication module.

Figure 3:
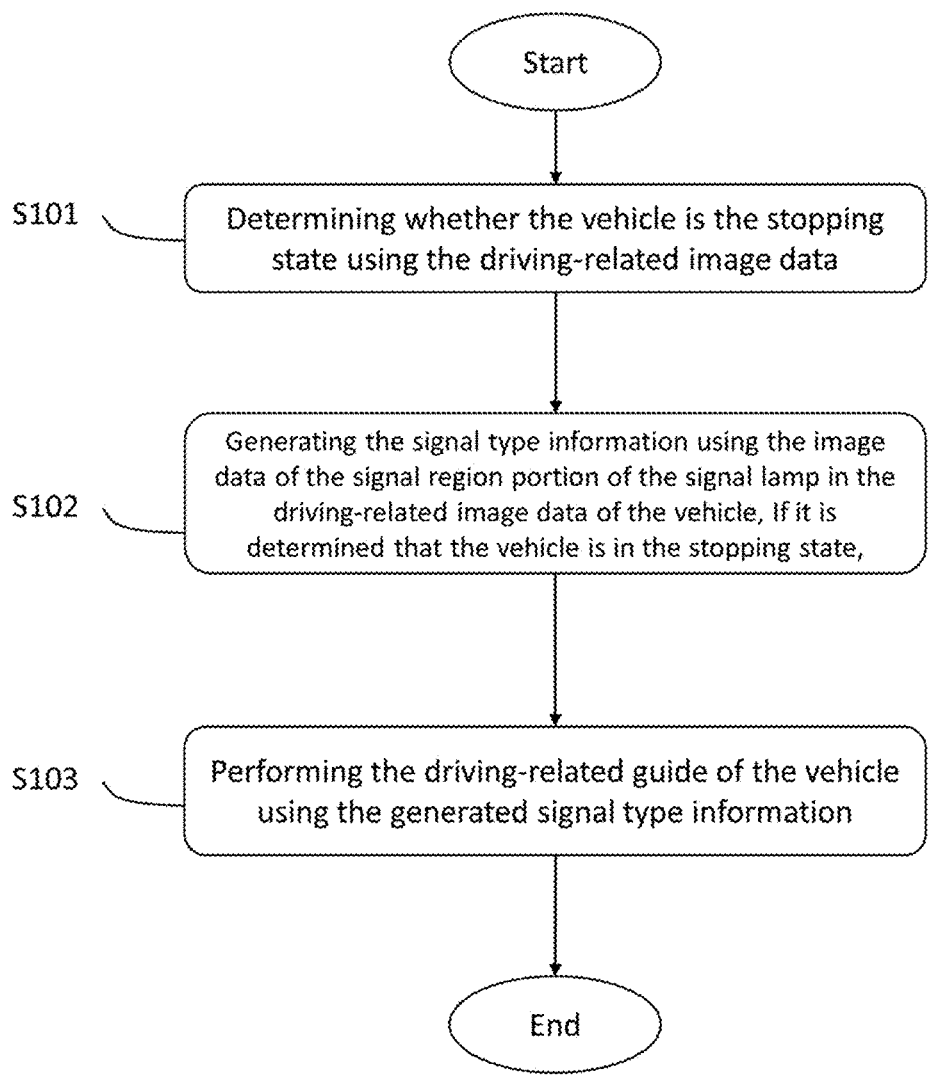
FIG. 3 is a flow chart depicting a method of generating the signal type information of an electronic apparatus according to an embodiment of the present invention.

FIG. 3 is a flow chart depicting a method of generating the signal type information of an electronic apparatus according to an embodiment of the present invention. Referring to FIG. 3, first, the electronic apparatus 100 may determine whether the vehicle is the stopping state using the driving-related image data (S101).

Further, if it is determined that the vehicle is in the stopping state, the electronic apparatus 100 may generate the signal type information using the image data of the signal region portion of the signal lamp in the driving-related image data of the vehicle (S102).

Further, the electronic apparatus 100 may perform the driving-related guide of the vehicle using the generated signal type information (S103).

Figure 4:
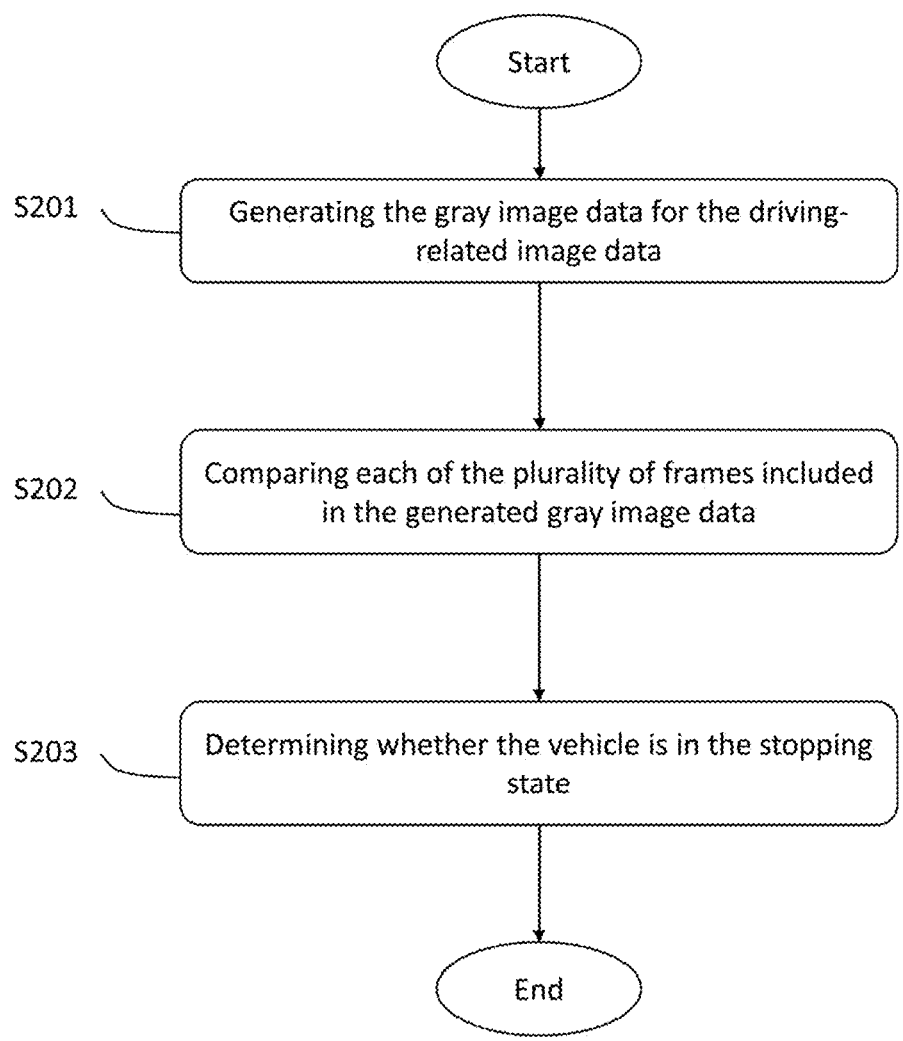
FIG. 4 is a flow chart depicting in detail a method of determining a stopping state of a vehicle according to an embodiment of the present invention.

FIG. 4 is a flow chart depicting in detail a method of determining a stopping state of a vehicle according to an embodiment of the present invention. Referring to FIG. 4, first, the electronic apparatus 100 may generate the gray image data for the driving-related image data (S201). Here, the driving-related image of the vehicle may include images for the stopping, running, etc., of the vehicle. Further, the driving-related image of the vehicle is an image photographed by the camera module included in the electronic apparatus 100 or may be an image that an image photographed by another apparatus is received by the electronic apparatus 100. Further, the driving-related image of the vehicle may be a red green blue (RGB) (color) image. This, will be described in detail with reference to FIG. 5.

Figure 5:
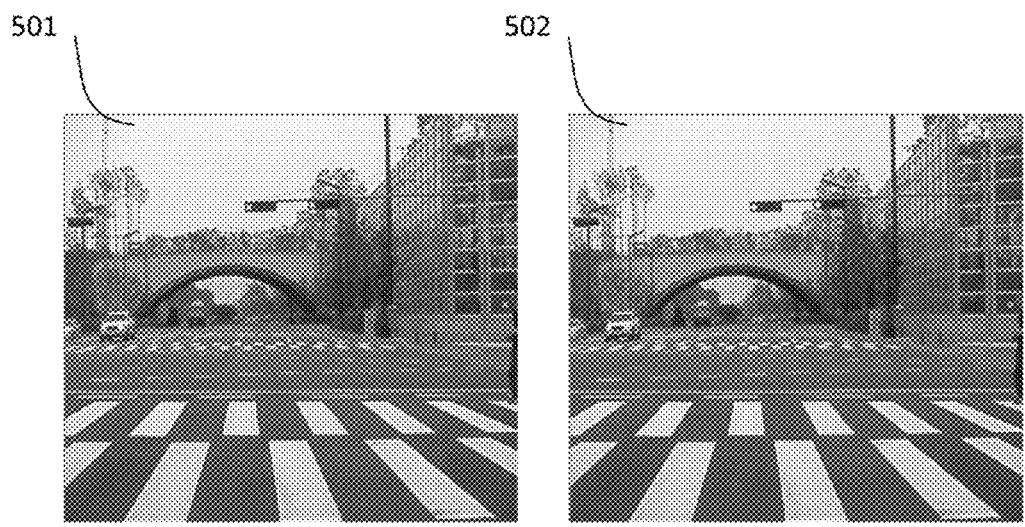
FIG. 5 is a view depicting a process of generating a gray image data from a driving-related image data according to an embodiment of the present invention.

FIG. 5 is a view depicting a process of generating a gray image data from a driving-related image data according to an embodiment of the present invention. Referring to FIG. 5, the driving state determining unit 150 may receive the driving-related image data which is a color image 501 and perform gray conversion to generate the gray image data 502.

Further, the electronic apparatus 100 may compare each of the plurality of frames included in the generated gray image data (S202). In detail, the driving state determining unit 150 may sequentially compare each of the plurality of frames included in the generated gray image data in a time order.

Further, as the comparison result, the electronic apparatus 100 may determine whether the vehicle is in the stopping state (S203). As an example, the driving state determining unit 150 may calculate the difference between a current frame and a previous frame and compare the calculated value with the preset value to determine whether the vehicle is in the stopping state.

According to a method of determining a stopping state of a vehicle as depicted in FIG. 4, determining the stopping state of the vehicle based on the gray image data, an image processing speed may be improved, and therefore it is possible to quickly determine whether the vehicle is in the stopping state in the driving state in which the running and the stopping of the vehicle are changed from hour to hour.

Meanwhile, the method of determining a stopping state of a vehicle as depicted in FIG. 4 is only the embodiment of the present invention and therefore is not limited thereto. Therefore, a method of determining various stopping states of a vehicle like determining whether the vehicle is in the stopping state based on the sensing information of the motion sensing unit 191 may be used.

Figure 6:
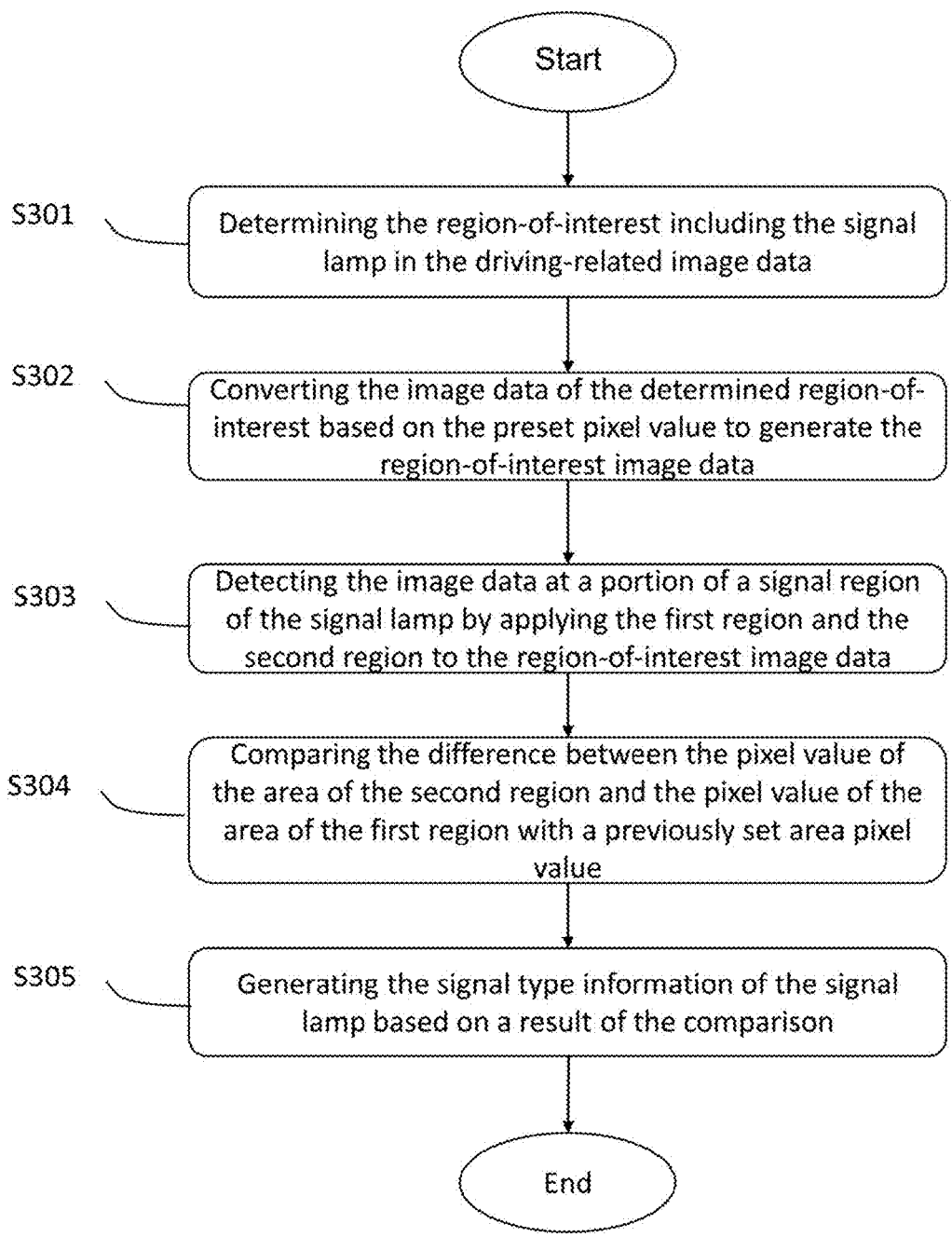
FIG. 6 is a flow chart depicting a method of generating the signal type information of an electronic apparatus according to an embodiment of the present invention.

FIG. 6 is a flow chart depicting a method of generating the signal type information of an electronic apparatus according to an embodiment of the present invention. Referring to FIG. 6, first, the electronic apparatus 100 may determine the region-of-interest including the signal lamp in the driving-related image data (S301).

In this case, the signal type information generation unit 140 may determine the region-of-interest including the signal lamp in the driving-related image data using, for example, a vanishing point. That is, the signal type information generation unit 140 may extract a line from the image photographed by the camera while the vehicle is driving and may extend the extracted line, and may determine a point where the extracted line crosses each other, as the vanishing point. Further, the signal lamp is positioned at an upper region of the vanishing point and therefore the signal type information generation unit 140 may determine the determined upper region of the vanishing point as the region-of-interest.

Meanwhile, as another example, the signal type information generation unit 140 may determine a predetermined region in the driving-related image data as the region-of-interest.

Further, the electronic apparatus 100 may convert the image data of the determined region-of-interest based on the preset pixel value to generate the region-of-interest image data (S302). In this case, the signal type information generation unit 140 may, as an example, generate the region-of-interest image data by adapting to the formula 1 the image data of the determined region of interest.

$$\frac{x \times R + y \times G + z \times B}{256} + K \qquad \text{[Formula 1]}$$

Here R, G, B represent the R, G, B values of the image data of the determined region of interest, and K represents the previously set pixel value which is a criteria of the conversion, and x, y, x represent specific coefficients. For example, K may be 128 which is the average pixel value.

Therefore, the signal type information generation unit 140 may generate the region-of-interest image data which clearly distinguishes from the signal region portion of the signal lamp.

Meanwhile, the color and/or forms corresponding to each of the multiple signal included in the signal lamp may different from each nation. In case of Korea, the stop signal is a red signal, a straight signal is a green signal, the left turn signal is a green left arrow, and a right turn signal is a green right arrow.

Therefore, the above previously set pixel values and the x, y, z may have different values depending on the algorithm.

Steps S301 and S302 will be described in detail with reference to FIG. 7.

Figure 7:
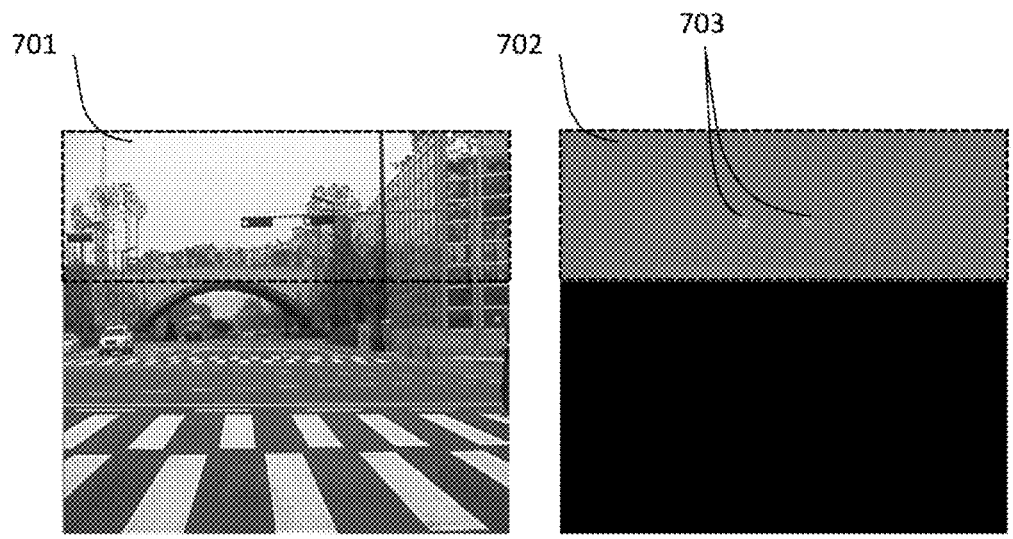
FIG. 7 is a view depicting a process of generating a region-of-interest image data from a driving-related image data according to an embodiment of the present invention.

FIG. 7 is a view depicting a process of generating a region-of-interest image data from a driving-related image data according to an embodiment of the present invention. Referring to FIG. 7, the signal type information generation unit 140 may determine the region-of-interest 701 including the signal lamp in the driving-related image data as depicted on the left side of FIG. 7.

Further, the signal type information generation unit 140 may convert the image data of the determined region-of-interest 701 to generate a region-of-interest image data 702 as depicted on the right side of FIG. 7. In this case, the signal type information generation unit 140 may convert the image data of the determined region-of-interest based on the preset pixel value to generate the region-of-interest image data 702.

Therefore, the signal type information generation unit 140 may generate the region-of-interest in which a signal region portion 703 of a signal lamp is clearly differentiated.

Meanwhile, the electronic apparatus 100 may detect the image data at a portion of a signal region of the signal lamp by applying the first region and the second region to the region-of-interest image data (S303). In more detail, the signal type information generation unit 140 may detect the image data of the signal region portion of the signal lamp by applying a first region having a first area to the region-of-interest image data and a second region including the first region and having a second area. Here, the first and second regions may be forms corresponding to the forms of the signal of the signal lamp. As an example, in case where the signal of the signal lamp is circular, elliptical or quadrangular, the first and second regions may be circular, elliptical and quadrangular.

Meanwhile, the electronic apparatus 100 may compare the difference between the pixel value of the area of the second region and the pixel value of the area of the first region with a previously set area pixel value (S304). Here, the previously set area pixel values may change by reflecting the color and/or forms corresponding to the multiple signals included in the signal lamp.

In addition, the electronic apparatus 100 may generate the signal type information of the signal lamp based on a result of the comparison (S305).

The steps S303, S304, and S305 will be described in details with reference to FIGS. 8 and 9.

Figure 8:
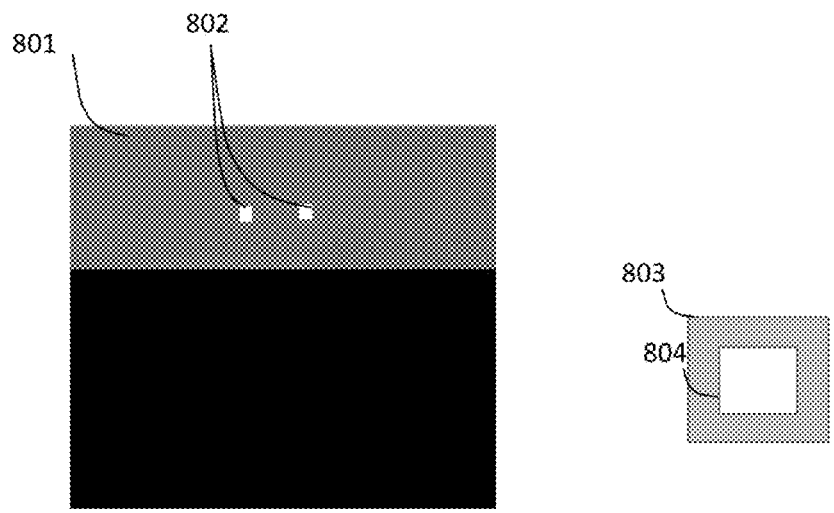
FIG. 8 is a view depicting a region-of-interest image data corresponding to a stop signal, and a stop signal determining method according to an embodiment of the present invention.

FIG. 8 is a view depicting a region-of-interest image data corresponding to a stop signal, and a stop signal determining method according to an embodiment of the present invention. In case where the signal lamp is a red stop signal, the signal type information generation unit 140 converts the image data in the region of interest including the signal lamp based on a previously set pixel value, as depicted on the left side of FIG. 8, the region-of-interest image data 801 can be generated. Here, the red stop signal of the signal lamp can be generated like 802 based on the region-of-interest image data 801.

In this case, the signal type information generation unit 140 may detect the image data of the signal region portion 802 of the signal lamp by applying the first region 804 and the second region 803 to the region-of-interest image data 801.

In addition, the signal type information generation unit 140 compares the difference between the area pixel value of the second region 803 and the area pixel value of the first region 804 with a previously set area pixel value, thus generating a signal type information of the signal lamp. As an example, the signal type information generation unit 140 may determine the signal type information as a stop signal if the difference between the area pixel value of the second region 803 and the area pixel value of the first region 804 is smaller than the previously set area pixel value (namely, as depicted on the right side of FIG. 8, the area pixel value of the first region 804 is larger).

Figure 9:
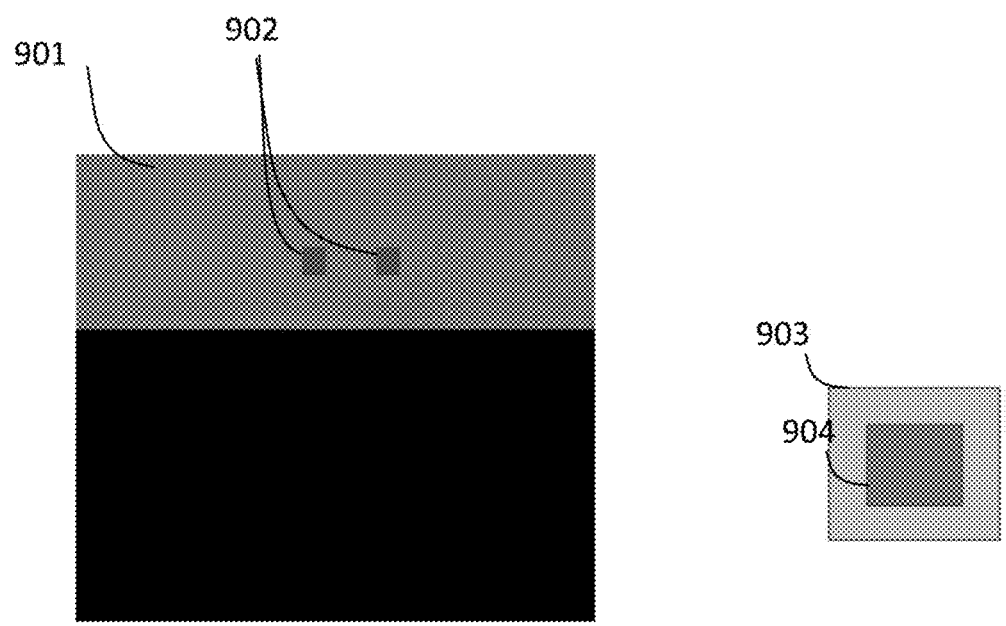
FIG. 9 is a view depicting a region-of-interest image data corresponding to a straight signal, and a straight signal determining method according to an embodiment of the present invention.

FIG. 9 is a view depicting a region-of-interest image data corresponding to a straight signal, and a straight signal determining method according to an embodiment of the present invention. In case where the signal lamp is a green straight signal, the signal type information generation unit 140 converts the image data in the region of interest including the signal lamp based on a previously set pixel value, as depicted on the left side of FIG. 9, the region-of-interest image data 901 may be generated. Here, the green straight signal of the signal lamp may be generated like 902 based on the region-of-interest image data 901.

In this case, the signal type information generation unit 140 may detect the image data of the signal region portion 902 of the signal lamp by applying the first region 904 and the second region 903 to the region-of-interest image data 901.

In addition, the signal type information generation unit 140 may compares the difference between the area pixel value of the second region 903 and the area pixel value of the first region 904 with a previously set area pixel value, thus generating a signal type information of the signal lamp. As an example, the signal type information generation unit 140 may determine the signal type information as a straight signal if the difference between the area pixel value of the second region 903 and the area pixel value of the first region 904 is larger than the previously set area pixel value (namely, as depicted on the right side of FIG. 9, the area pixel value of the first region 904 is smaller).

Meanwhile, although not omitted in FIGS. 8 to 9, even the judgment of the turn signal like the left turn and the right turn may be similarly performed to the method. That is, the signal type information generation unit 140 may determine the signal type information using the method and/or the shape (for example, arrow shape) of the image data of the signal region portion of the signal lamp.

According to the method of generating the signal type information as depicted in FIG. 6, the signal type information is determined as the state in which the region-of-interest image data is averaged based on the preset pixel value, and therefore the image processing speed may be improved, such that the signal type information may be quickly determined in the state in which the running and the stopping of the vehicle are changed from hour to hour.

Meanwhile, the method of generating the signal type information as depicted in FIG. 6 is only the embodiment of the present invention and therefore is not limited thereto. Therefore, a method of generating various signal type information such as determining the signal type information, etc., by detecting the red signal corresponding to the stop signal or detecting the green signal corresponding to the straight signal from the driving-related image data which is the color image may be used.

Meanwhile, according to the embodiment of the present invention, if it is determined that the signal type information is to be the stop signal, the signal type information generation unit 140 may previously position the first region and the second region in the region in which the starting signal and the turn signal like the left turn/right turn in the region-of-interest image data are displayed. In this case, the signal type information generation unit 140 may position the first region and the second region at the position in advance using the position relation information of the plurality of signals stored in the storing unit 110. In this case, it is possible to more quickly determine the change from the stop signal to the straight signal or the rotation signal like the left turn/right turn by increasing the image processing speed.

Figure 10:
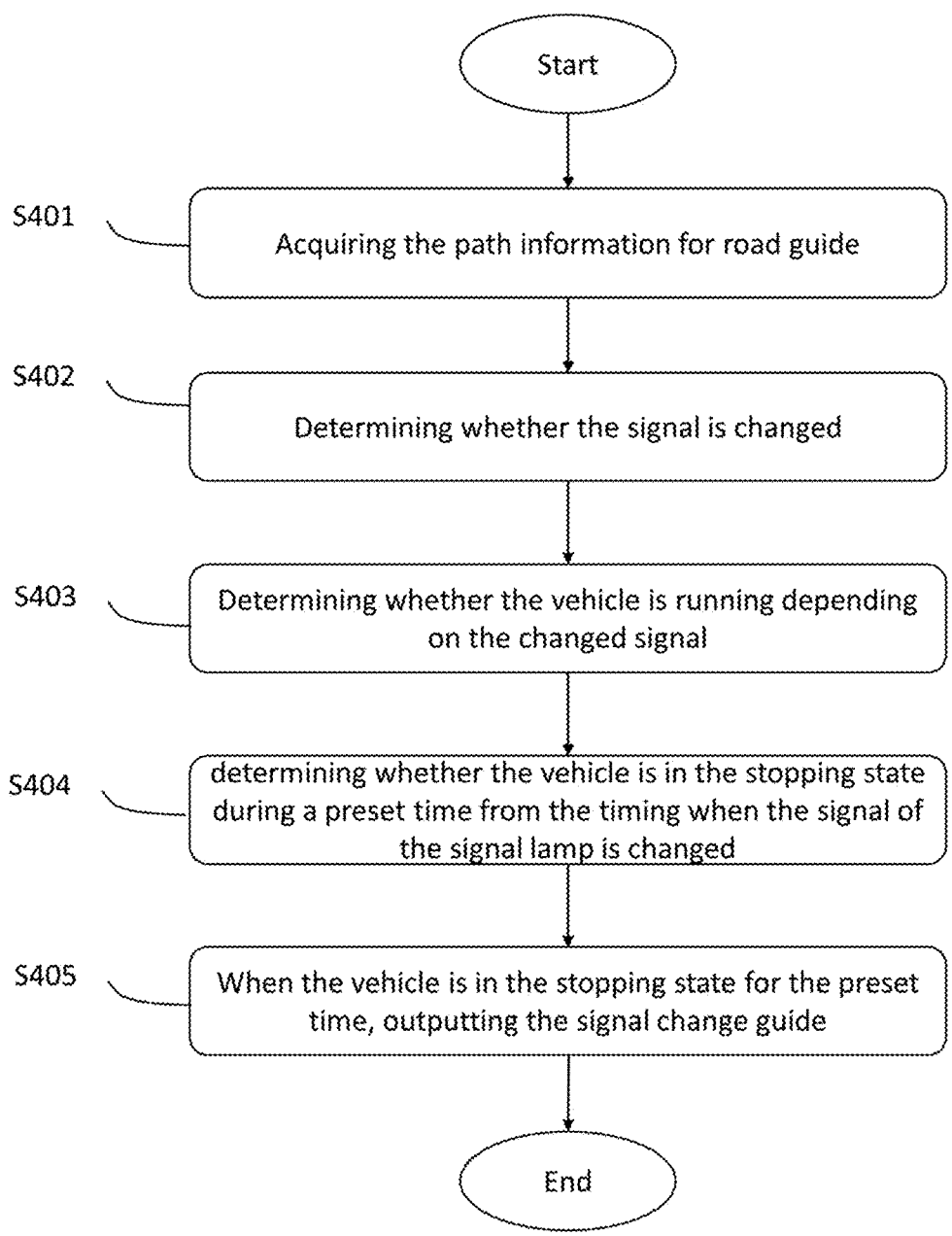
FIG. 10 is a flow chart depicting a signal change guiding method of an electronic apparatus according to an embodiment of the present invention.

FIG. 10 is a flow chart depicting a signal change guiding method of an electronic apparatus according to an embodiment of the present invention. Referring to FIG. 10, the electronic apparatus 100 may acquire the path information for road guide (S401). In detail, when the electronic apparatus 100 performs the road guide to the destination of the vehicle, the control unit 170 may acquire the path information for road guide at the current position of the vehicle.

Further, the electronic apparatus 100 may determine whether the signal is changed (S402). In detail, the control unit 170 may determine whether the signal is changed based on the signal type information generated from the signal type information generation unit 140.

Further, when the signal is changed, the electronic apparatus 100 may determine whether the vehicle needs to run in accordance with the changed signal (S403). For example, when the signal type information generated from the signal type information generation unit 140 is changed from the stop signal to the left turn signal in the state in which the path information of the vehicle stopping at the intersection is in the straight direction, the control unit 170 may determine that the vehicle should not run. As another example, when the signal type information generated from the signal type information generation unit 140 is changed from the stop signal to the straight signal in the state in which the path information of the vehicle stopping at the intersection is in the straight direction, the control unit 170 may determine that the vehicle needs to run.

Further, when the vehicle needs to run, the electronic apparatus 100 may determine whether the vehicle is in the stopping state during a preset time from the timing when the signal of the signal lamp is changed (S404).

Further, when the vehicle is in the stopping state for the preset time, the electronic apparatus 100 may output the signal change guide (S405).

Figure 11:
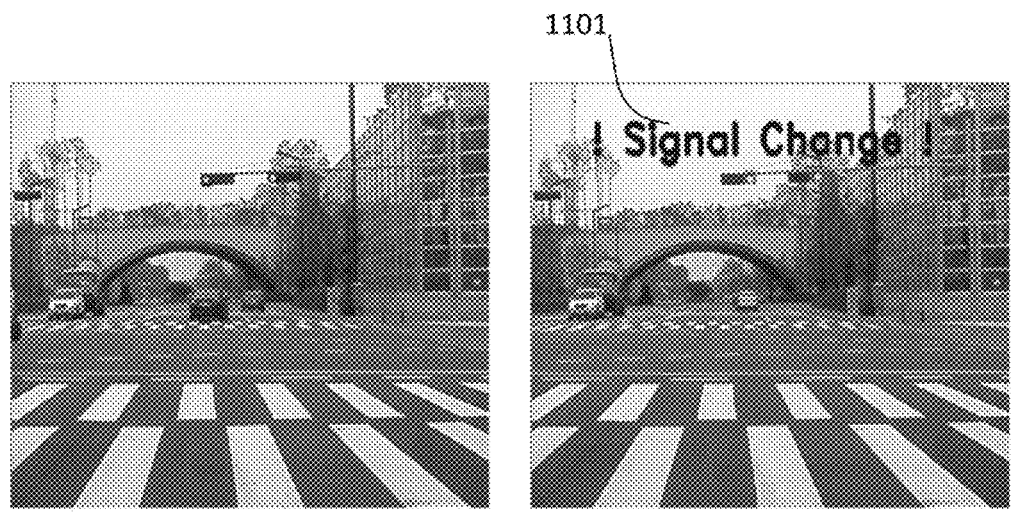
FIG. 11 is a view depicting a signal change guide screen according to an exemplary embodiment of the present invention.

FIG. 11 is a view depicting a signal change guide screen according to an exemplary embodiment of the present invention; Referring to FIG. 11, the electronic apparatus 100 according to the embodiment of the present invention may display the signal change guide screen on the augmented reality.

For example, when the signal state of the signal lamp is changed from the stop signal as depicted on the left side of FIG. 11 to the straight signal as depicted on the right side of FIG. 11, the augmented reality provision unit 160 may generate the overlaid indicator in the augmented reality and output a generated signal change guide indicator 1101 on the augmented reality as depicted on the right side of FIG. 11.

Figure 12:
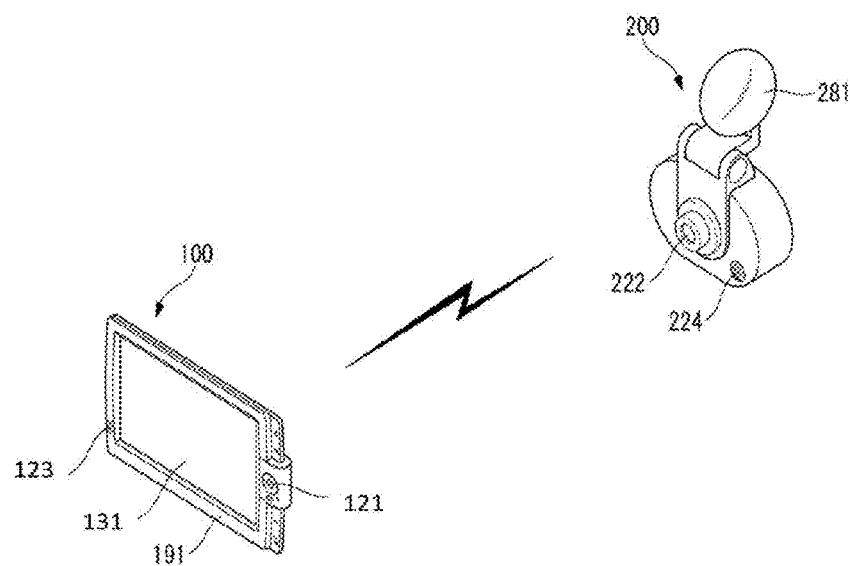
FIG. 12 is a view depicting an implementation form in case where a camera and an electronic apparatus are separate types according to an embodiment of the present invention.

FIG. 12 is a view depicting an implementation form in case where a camera and an electronic apparatus are separate types according to an embodiment of the present invention. Referring to FIG. 12, a vehicle black box 200 which is provided separate from the vehicle navigation 100 may constitute the system according to an embodiment of the present invention using the wired/wireless communication method.

The vehicle navigation 100 may include, but not limited to a display unit 145 provided at a front portion of a navigation housing 191, a navigation controlling key 193, and a navigation microphone 195.

The vehicle black box 200 can obtain a data of a vehicle during the running or stop of the vehicle. Namely, it is possible to photograph the images during the running of the vehicle and the images even when the vehicle is parked. The quality of the images obtained through the vehicle black box 200 may be constant or vary. As an example, the quality of the images before or after the occurrence of an accident may be high, and in the normal occasions, the quality of the images is low so as to minimize the required storing space since it needs to store important images.

The vehicle black box 200 may include, but not limited to, a black box camera 222, a black box microphone 224 and an attaching unit 281.

Meanwhile, FIG. 12 depicts that the vehicle black box 200 provided separate from the vehicle navigation 100 is connected in a wired/wireless communication method, but the vehicle navigation 100 and the vehicle black box 200 may not be connected in the wired/wireless communication method. In this case, if a storing medium capable of storing the photographed images of the black box 200 is inserted in the electronic apparatus 100, the electronic apparatus 200 may have a function of the vehicle navigation 100 or the vehicle navigation 100 may be integrally provided. This configuration, as depicted in FIG. 13, will be described in detail.

Figure 13:
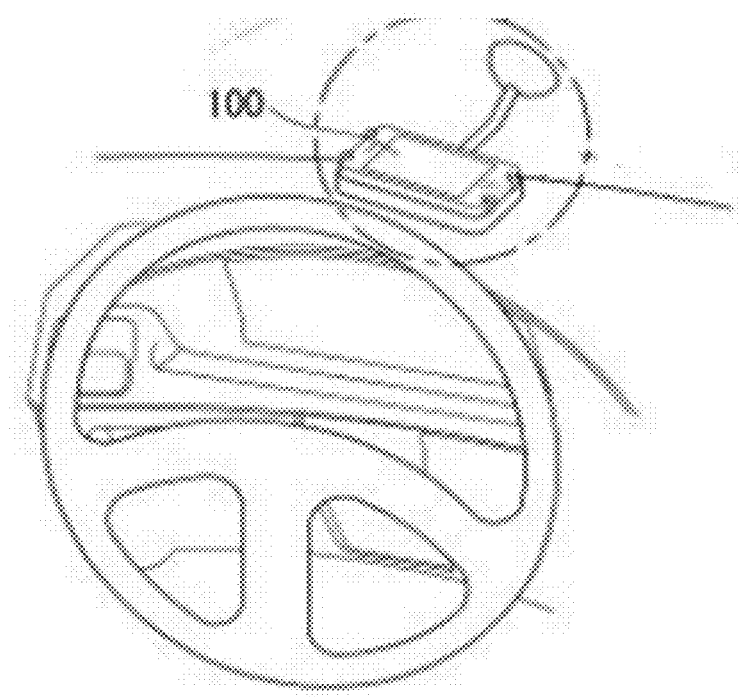
FIG. 13 is a view depicting an implementation form in case where a camera and an electronic apparatus are integrated types according to an embodiment of the present invention.

FIG. 13 is a view depicting the implementation form wherein the camera and the electronic apparatus are integral, according to an embodiment of the present invention. Referring to FIG. 13, if the electronic apparatus has a camera function, the user can install the electronic apparatus which allows a camera portion of the electronic apparatus to photograph the forward scenes of the vehicle and the display portion of the electronic apparatus to recognize the user, thus implementing the system according to an embodiment of the present invention.

Figure 14:
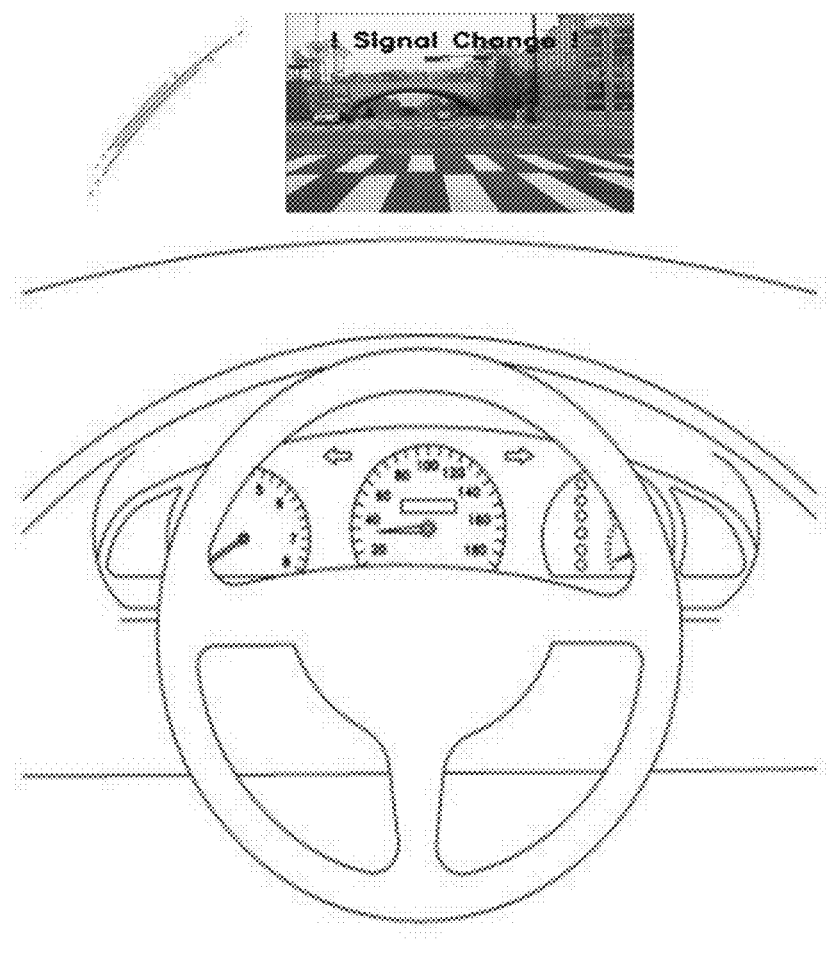
FIG. 14 is a view depicting an implementation form which uses a HUD (Head-UP Display) and an electronic apparatus according to an embodiment of the present invention.

FIG. 14 is a view depicting the implementation form by using the HUD (Head-UP Display) and the electronic apparatus according to an embodiment of the present invention. Referring to FIG. 14, the electronic apparatus may display the AR guide screen on the head-up display with the help of the head-up display and the wired/wireless communication.

Meanwhile, the control method of the electronic apparatus according to various embodiments of the present invention are implemented in the form of program codes, which may be provided to each server or device in a state where such program devices are stored in various non-transitory computer readable medium.

The non-transitory computer readable medium is not a medium, for example, a register, a cash, a memory, etc., which is designed to store for short time period, but a medium which can store data semi-permanently and can be read by a device. In detail, the above various applications or programs may be stored in the non-transitory readable medium, for example, CD, DVD, a hard disk, a blue ray disk, USB, a memory card, ROM, etc.

In addition, as the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A control method of an electronic apparatus, the method comprising:
   generating signal type information using image data of a signal region portion of a signal lamp in driving-related image data of a vehicle; and
   performing a driving-related guide of the vehicle using the generated signal type information,
   wherein the generating of the signal type information includes:
   determining a region-of-interest including the signal lamp in the driving-related image data;
   converting image data of the determined region-of-interest based on a preset pixel value;
   generating region-of-interest image data in which the signal region portion of the signal lamp and a non-signal region portion are distinguished according to the converting;
   calculating an area pixel value of a second region and an area pixel value of a first region from image data of the signal region portion;
   comparing a difference between the area pixel value of the second region and the area pixel value of the first region with a preset area pixel value; and
   generating the signal type information of the signal lamp according to a result of the comparison,
   wherein the first region has a first area and the second region includes the first region and has a second area.

2. The control method of claim 1, further comprising:
   determining whether the vehicle is in a stopping state using the driving-related image data,
   wherein the generating of the signal type information is performed when the vehicle is in the stopping state.

3. The control method of claim 2, wherein the determining whether the vehicle is in the stopping state includes:
   generating gray image data for the driving-related image data; and
   determining whether the vehicle is in the stopping state by comparing each of a plurality of frames included in the generated gray image data.

4. The control method of claim 2, wherein the signal type information is information for identifying each of a plurality of signals which is displayed in the signal lamp.

5. The control method of claim 4, wherein the performing of the driving-related guide of the vehicle includes outputting a signal guide using the signal type information.

6. The control method of claim 4, wherein the performing of the driving-related guide of the vehicle includes outputting a signal change guide using path information for road guide of the vehicle and the signal type information.

7. The control method of claim 6, wherein the outputting is performed if the vehicle is in a stopping state during a preset time from timing when the signal of the signal lamp is changed.

8. The control method of claim 7, wherein the outputting includes:
   generating an indicator for performing the driving-related guide; and
   outputting the generated indicator based on augmented reality.

9. An electronic apparatus, comprising:
   a processor generating signal type information using image data of a signal region portion of a signal lamp in driving-related image data of a vehicle; and
   a controller performing a driving-related guide of the vehicle using the generated signal type information,
   wherein the processor is configured to:
   determine a region-of-interest including the signal lamp in the driving-related image data,
   convert image data of the determined region-of-interest based on a preset pixel value,
   generate region-of-interest image data in which the signal region portion of the signal lamp and a non-signal region portion are distinguished according to the converting,
   calculate an area pixel value of a second region and an area pixel value of a first region from image data of the signal region portion,
   compare a difference between the area pixel value of the second region and the area pixel value of the first region with a preset area pixel value, and
   generate the signal type information of the signal lamp according to a result of the comparison,
   wherein the first region has a first area and the second region includes the first region and has a second area.

10. The electronic apparatus of claim 9, wherein the processor is further configured to:
    determine whether the vehicle is in a stopping state using the driving-related image data, and
    wherein the controller controls the processor to generate the signal type information in response to the vehicle being in the stopping state.

11. The electronic apparatus of claim 10, wherein the processor is further configured to generate gray image data for the driving-related image data and compare each of a plurality of frames included in the generated gray image data to determine whether the vehicle is in the stopping state.

12. The electronic apparatus of claim 10, wherein the signal type information is information for identifying each of a plurality of signals which is displayed in the signal lamp.

13. The electronic apparatus of claim 12, wherein the controller controls an output unit to output a signal guide using the signal type information.

14. The electronic apparatus of claim 12, wherein the controller outputs a signal change guide using path information for road guide of the vehicle and the signal type information.

15. The electronic apparatus of claim 14, wherein the controller controls the output unit to output the signal change guide if the vehicle is in a stopping state during a preset time from timing when the signal of the signal lamp is changed.

16. A non-transitory recording medium recorded with a program code for executing the control method of claim 1 on a computer.

* * * * *